INVENTOR
RUDOLF W. GUERTLER
ATTY

Jan. 28, 1969    R. W. GUERTLER    3,424,137
INTERNAL COMBUSTION ENGINE COMBUSTION CHAMBER
Filed May 8, 1967    Sheet 2 of 2

INVENTOR
RUDOLF W. GUERTLER
ATTY

United States Patent Office 3,424,137
Patented Jan. 28, 1969

3,424,137
INTERNAL COMBUSTION ENGINE COMBUSTION CHAMBER
Rudolf W. Guertler, Fort Wayne, Ind., assignor to International Harvester Company, Chicago, Ill., a corporation of Delaware
Filed May 8, 1967, Ser. No. 636,846
U.S. Cl. 123—30                            10 Claims
Int. Cl. F02b 3/00

ABSTRACT OF THE DISCLOSURE

A piston construction wherein the combustion chamber located in the upper part of the piston is formed with a cross-over member to strengthen the combustion chamber opening. The cross-over member also protects certain areas of the cylinder head with which the piston is associated by preventing the combustion gases from reaching these areas thereby reducing the possibility of excessive thermal stresses. In addition, openings are positioned in the piston head leading from the combustion chamber to divert hot combustion gases away from that portion of the cylinder head where inurious thermal stresses are most likely to occur.

---

This invention relates to pistons for internal combustion engines and particularly to those types of pistons which have a combustion chamber formed in the head thereof.

In pistons which have combustion chambers incorporated therein, a large opening usually is located centrally above the chamber. Such a structure is generally shown, for example, in U.S. Patent 2,925,070 to S. Meurer, issued Feb. 16, 1960. A construction of this type with the large opening above the combustion chamber presents a number of potential problems. First, the combustion chamber opening is subject to cracking, resulting from mechanical and thermal stresses. The second problem arises with respect to the bridge in the cylinder head which is formed between the valve openings. Hot gases of combustion also tend to subject this area between the valve openings to severe thermal stresses which cause cracking of this bridge. In addition, with the central opening at the top of the piston head, fuel tends to reach the relatively cool cylinder head surface resulting in incomplete combustion and a consequent odorous exhaust emission.

A principal object of this invention is to provide a strengthened piston member which will be less subject to cracking as a result of mechanical and thermal stresses.

Another object is to provide in a piston member having a combustion chamber a strengthening member which is effective to prevent cracking of the combustion chamber opening.

Another object is to provide in a piston member of an internal combustion engine means for directing combustion gases from the piston combusion chamber away from areas which may be adversely affected by thermal stresses.

Still another object is to provide in a piston member having a combustion chamber, a cross-over construction in the upper portion of the piston, which will be effective both to strengthen the piston member to decrease the propensity for cracking and which will also be effective to prevent cracking of the cylinder head in conjunction with which the piston member operates.

A further object of this invention is to construct the head of the piston member in a manner to prevent fuel from reaching the relatively cool cylinder head surface and thereby reduce the formation of objectionable odorous exhaust emissions.

The above and other objects and advantages of the invention will be more readily apparent when read in conjunction with the accompanying drawings in which.

Figure 1:
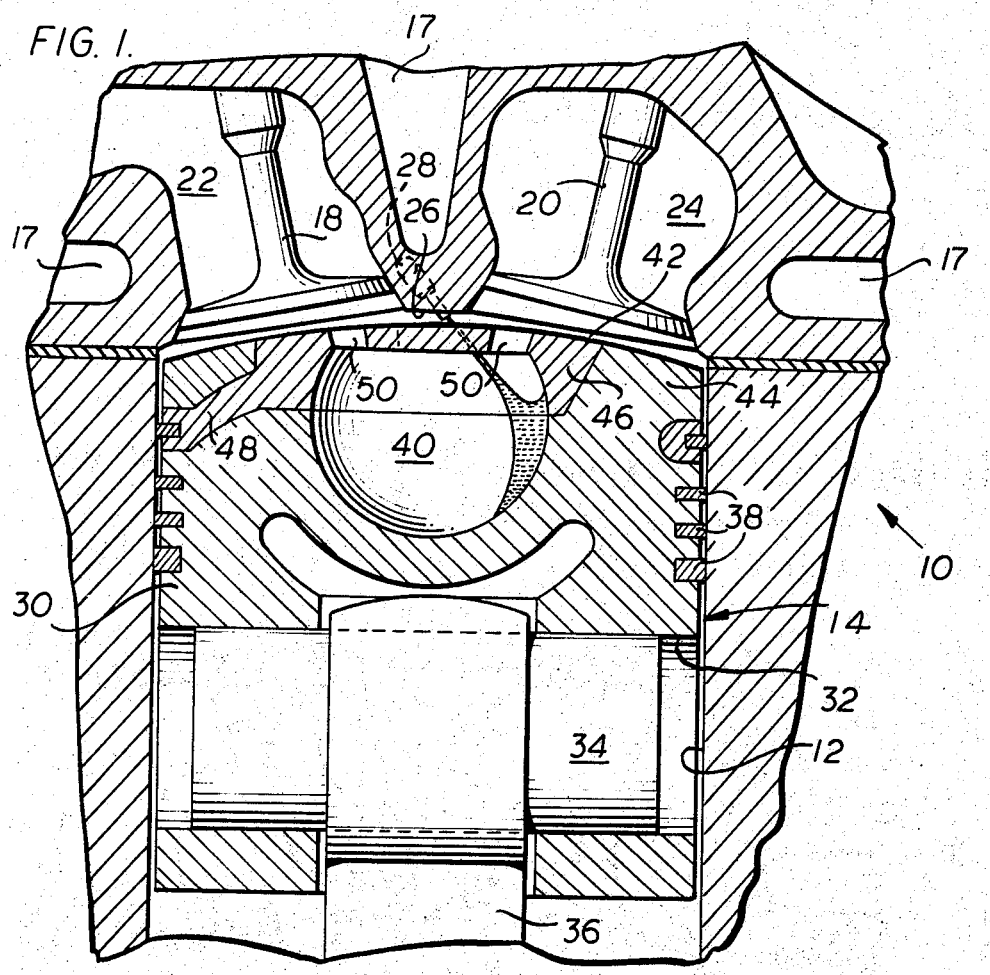
FIGURE 1 is a cross-sectional view of a portion of an internal combustion engine showing a piston embodying the principles of the invention and showing a combustion chamber cross-over member.

Referring now to the drawings, wherein like reference characters in the several views refer to similar parts, 10 indicates generally a portion of an internal combustion engine normally having a purality of piston and cylinder arrangements. One such piston and cylinder arrangement is shown in FIGURE 1 and comprises a cylinder 12 in which a piston assembly 14 is disposed. A portion of a cylinder head is shown at 16 including water jacket passages 17. An air intake valve 18 and an exhaust valve 20 are disposed in air intake port 22 and exhaust port 24 respectively in the cylinder head adjacent the upper end of the cylinder 12. The inlet and exhaust ports are separated by a bridge 26 and it is this bridge section which is subjected to cracking by thermal stresses. This is one of the problems sought to be avoided by this invention.

A fuel injection nozzle 28 may be located in this bridge section 26 and positioned so that its spray is directed against the wall of a combustion chamber in the piston head of piston assembly 14.

The piston assembly 14 comprises a piston head 30 which is of cylindrical construction and is disposed for reciprocable movement along its longitudinal axis within the cylinder 12. A transverse bore 32, having its axis transverse to the longitudinal axis of the piston head is formed in the lower portion of the piston head for receiving a wrist pin 34 on which a piston rod 36 comprising part of the piston assembly is journalled. The other end of the piston rod 36 is journalled to a crankshaft (not shown). Piston rings 38 may be fitted on the piston head 30 in a conventional manner.

Figure 2:
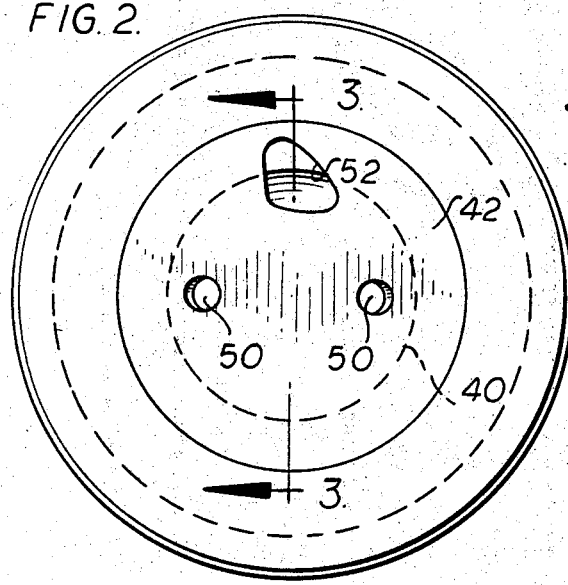
FIGURE 2 is a top view of the piston of FIGURE 1.
Figure 3:
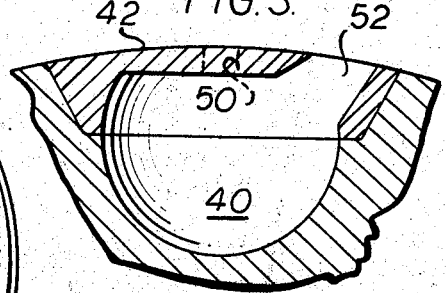
FIGURE 3 is a partial sectional view of the upper part of the piston taken along line 3—3 of FIGURE 2.
Figure 4:
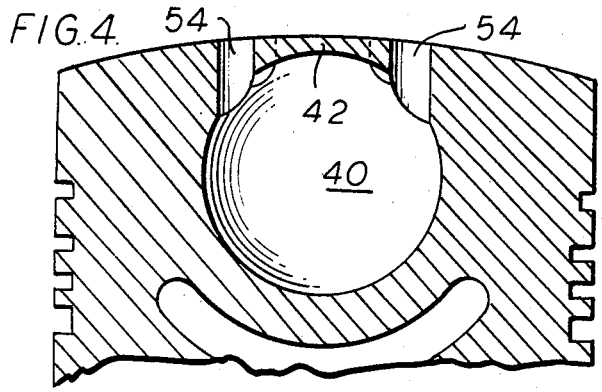
FIGURE 4 is an elevation view in section of a modified form of the invention showing the upper portion of a piston wherein the combustion chamber cross-over member is of the same material as the rest of the piston.
Figure 5:
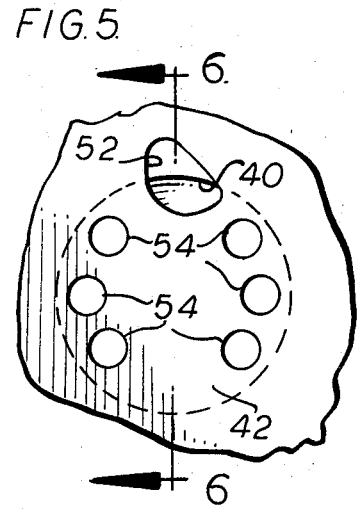
FIGURE 5 is a top view of the combustion chamber cross-over member of FIGURE 4.
Figure 6:
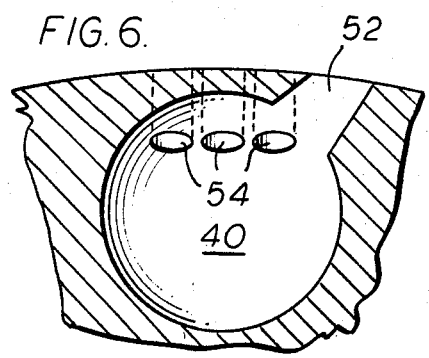
FIGURE 6 is a partial sectional view in elevation of the upper part of the piston taken along line 6—6 of FIGURE 5 showing openings for the escape of combustion gases.

A combustion chamber 40, which is here shown as being of a spherical design, is formed in the upper portion of the piston. A cross-over means 42 spans the opening of the combustion chamber 40 and is formed as a continuous part of the upper portion 44 of the piston head 30. The cross-over means is intended to provide strength and resist mechanical and thermal stresses which tend to pull the combustion chamber opening apart, thereby causing it to crack. This cross-over means may be formed as a separate insert 46 as shown in FIGURES 1–3 or as an integral part of the piston head itself as shown in the modifications of FIGURES 4–10. It will be appreciated that without such a cross-over means, there would be a large opening in the upper surface of the piston leading from the combustion chamber, such as is shown in U.S. patent to Meurer 2,925,070 referred to above. Because of mechanical and thermal stresses, it has been found that the top edge of such a large opening has a tendency to crack. This cracking spreads to the rest of the piston head and rapid deterioration takes place. It has been found, for example, that with a centrally located opening in the upper surface of the piston head which may be, for example, nearly as large in diameter as the diameter of the combustion chamber itself or somewhat smaller, cracking will begin at the lip of the opening and then will work its way down into the piston head. It appears that the most highly stressed area is about 90° from the wrist pin in a vertical plane, and cracking may be expected to occur in such vertical plane illustrated as running approximately through line 3—3 in FIGURE 2 and commence where such plane intersects the opening lip of the combustion chamber. Accordingly, a generally imperforated portion of the cross-over member 42 is laid substantially in the plane defined by line 3—3 to exert maximum strengthening effect on the piston structure. It provides strength and resists mechanical and thermal stresses which would otherwise tend to pull a combustion chamber opening apart, causing it to crack.

The cross-over member may be a separate insert 46 of high heat resistant material and may be cast in place in the piston head. The insert 46 shown in FIGURES 1–3 is a substantially round piece of material and may be constructed with one or a plurality of outwardly projecting struts or fingers 48 cast into the piston for additional support in the piston head. Other suitable means may be used to secure the insert to the piston head such as welding, shrink fitting, or screws. Openings 50 are formed in the cross-over member 46 communicating with the combustion chamber 40 to allow combustion gases to escape. An opening 52 is also formed in the cross-over member 46 through which fuel is injected by the nozzle 28, the fuel being directed against the wall of the combustion chamber to form a film thereon for easy vaporization and ignition.

Another important feature of this invention lies in the protection given to the bridge portion 26 of the cylinder head lying between the air intake port 22 and exhaust port 24. If there would be no cross-over means 42 and leaving a large opening in the upper surface of the piston head from the combustion chamber, the bridge section 26 of the cylinder head would be subjected to severe thermal stresses. These thermal stresses are damaging and can cause the bridge section to crack. It will be observed from FIGURES 1 and 2 that the solid area of the cross-over member 46 is positioned along the center line of the piston in axial alignment with the bridge section 26 thereby preventing direct exposure of the bridge section to the combustion gases. The openings 50 allowing for the escape of the combustion gases are positioned to divert the gases away from the bridge section 26.

An additional feature of importance is that the cross-over means prevents unburned fuel from being hurled against the cylinder head. The cross-over means will heat up after a cold start much quicker and to a higher temperature level than the cylinder head. Any fuel which is hurled upward from the combination chamber toward the cylinder head will deposit on the hot surface of the cross-over and will vaporize and ignite readily, thereby eliminating odorous smell of unburned fuel in the exhaust gases which would otherwise result if no cross-over means were present. This is particularly important at idling and light load operation and during cold weather conditions.

In FIGURES 4–10 the cross-over means 42 comprises an integral part of the piston head itself, i.e., it is made of the same material as the rest of the piston head. In the modification illustrated in FIGURES 4–6, a plurality of holes or openings 54 communicate with the combustion chamber 40 and serve the same function as the opening 50 of the embodiment shown in FIGURES 1–3, i.e., to allow the escape of combustion gases from and the introduction of fresh air into the combustion chamber 40. It will be observed from FIGURE 5 that the holes 54 are substantially symmetrically disposed on each side of the line 6—6 which in effect is an axis of the cross-over means. Thus the cross-over means is laid along the line 6—6 and in a plane through the line 6—6 and at substantially 90° to the axis of the wrist pin.

Figure 8:
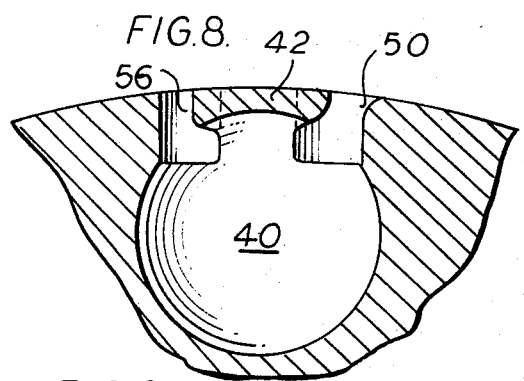
FIGURE 8 is an elevation view of a portion of a piston showing a combustion chamber cross-over member and taken through line 8—8 of FIGURE 7.
Figure 7:
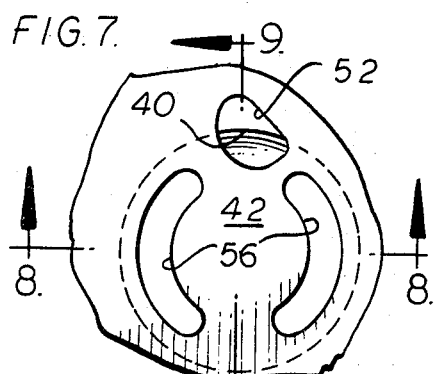
FIGURE 7 is a top view of another modified form of a combustion chamber cross-over member showing openings for the escape of combustion gases.
Figure 9:
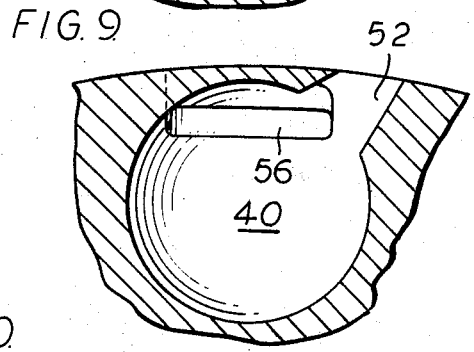
FIGURE 9 is a partial sectional view in elevation taken through the line 9—9 of FIGURE 7.
Figure 10:
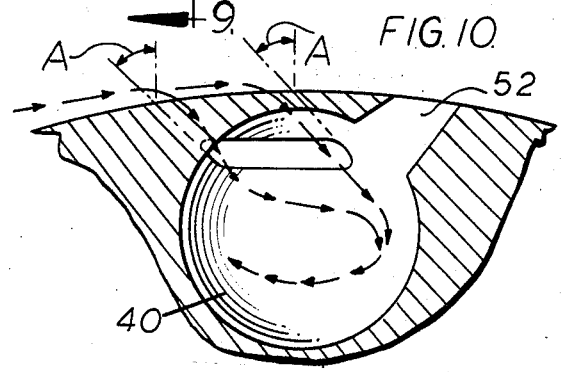
FIGURE 10 is a view similar to that shown in FIGURE 9 showing the kidney shaped openings in the piston head formed at an angle.

In the modification shown in FIGURES 7–9, the same is true, i.e., the cross-over means is laid along the line 4–9 and in a plane through the line 9–9 and at substantially 90° to the axis of the wrist pin. In FIGURES 7–9, the openings for providing for the introduction of fresh air into and/or, escape of combustion gases from the combustion chamber 40 are in the form of arcuately formed or kidney shaped openings 56 lying on opposite sides of line 9—9. The openings 54 of the modifications of FIGURES 4–6 and the openings 56 of the modification of FIGURES 7–9 are positioned to divert the combustion gases away from the bridge section 26 just as are the openings 50 shown in FIGURES 1–3. In the event that an air swirl is employed, it would be advantageous to arrange the openings 56 at an angle A as shown in FIGURE 10. The same would be true of openings 50 and 54.

It will be apparent from the foregoing, that the use of a cross-over means overlying the combustion chamber of a piston head may provide substantial advantages in piston construction and in the operation of the internal combustion engine. First of all, the cross-over means, whether it be an integral part of the piston head or a separate insert cast into the piston head construction, serves as a strengthening member effective to prevent the piston from cracking. Secondly, the cross-over means may be utilized to keep injurious combustion gases from impinging directly on certain parts of the cylinder head, such as the bridge section between the air inlet and exhaust valve. This advantageously subjects the bridge section to less undesirable thermal stresses which would tend to make it crack. In addition, the cross-over means in preventing fuel from being hurled against the cylinder head, decreases the odorous smell of unburned fuel in the exhaust gases.

It is also to be understood that by varying the areas of the openings formed through the cross-over means 42 with respect to each other, the rate at which the combustion gases escape the combustion chamber therethrough may be controlled. Thus, it is possible to intentionally limit the quantity of combustion gases escaping the combustion chamber which are directed toward the exhaust valve by deliberately forming the opening means oriented for directing the combustion gases toward the exhaust valve of a relatively small cross sectional area than the other gas-directing opening means in the cross-over means 42. During the operation of the engine, the exhaust valve is usually one of the hotest components in the assembly and could be protected by intentionally limiting the quantity of combustion gases directed toward it. Conversely, so as not to impede scavenging of the combustion chamber, opening means in the cross-over means 42 responsible for directing the combustion gases toward the intake valve are made proportionately larger in cross sectional area. This is acceptable and desirable from a heat transfer point of view since the intake valve is relatively cool in an operating internal combustion engine. Furthermore, by utilizing appropriate means for rotating the intake valve, the heat imparted thereto by the combustion gases directed thereto, including the additional quantity diverted from the exhaust valve, is evenly distributed. It will also be appreciated that the heat will also be evenly distributed to the valve seat and can be effectively dissipated by the coolant flowing in the coolant passages adjacent thereto.

What is claimed is:

1. A piston assembly for an internal combustion engine comprising: a piston including a piston head, said piston being provided with a wrist pin receiving bore having a longitudinal axis substantially perpendicular to to longitudinal axis of said piston; means defining a combustion chamber in said piston head, said combustion chamber opening into the normally uppermost face of said piston head; and cross-over means rigidly fixed with respect to said piston head and covering said combustion chamber opening in said normally uppermost face of said piston head, said cross-over means having a plurality of opening means therethrough for the passage of air and combustion gases to and from said combustion chamber and a single opening therethrough for the injection of fuel to said combustion chamber, said single opening being disposed in a portion of said cross-over means contained in a plane passing through the longitudinal axis of said piston and substantially perpendicular to the longitudinal axis of said wrist pin receiving bore and constituting the only passage to said combustion chamber through said cross-over portion.

2. A piston assembly for an internal combustion engine as set forth in claim 1, wherein said combustion chamber is formed as a surface of revolution in said piston head; and wherein the axes of said plurality of opening means are inclined with respect to the longitudinal axis of said piston and are substantially tangent to the surface of said combustion chamber.

3. A piston assembly for an internal combustion engine as set forth in claim 1, wherein at least one of said plurality of opening means is disposed on each side of said cross-over means portion.

4. A piston assembly for an internal combustion engine as set forth in claim 3, wherein each of said plurality of opening means is in the form of an arcuately extending, kidney-shaped opening.

5. In an internal combustion engine, the combination comprising: a cylinder; a cylinder head covering said cylinder; a piston reciprocable in said cylinder and including a piston head, said piston being provided with a wrist pin receiving bore having a longitudinal axis substantially perpendicular to the longitudinal axis of said piston; intake and exhaust valve means disposed in said cylinder head; said intake and exhaust valve means being separated by a bridge portion of said cylinder head; means defining a combustion chamber in said piston head, said combustion chamber opening into the surface of said piston head facing said cylinder head; and cross-over means rigidly fixed with respect to said piston head and covering said combustion chamber opening in said piston head surface, said cross-over means having a plurality of opening means therethrough for the passage of air and combustion gases to and from said combustion chamber and a single opening therethrough for the injection of fuel to said combustion chamber, said single opening being disposed in portion of said cross-over means contained in a plane passing through the longitudinal axis of said piston and substantially perpendicular to the longitudinal axis of said wrist pin receiving bore and constituting the only passage to said combustion chamber through said cross-over means portion, said cross-over means portion and said bridge portion of said cylinder head lying substantially in a common plane.

6. In an internal combustion engine as set forth in claim 5, wherein at least one of said plurality of opening means is disposed on each side of said cross-over means portion.

7. In an internal combustion engine as set forth in claim 6, wherein the opening means disposed on one side of said cross-over means portion direct combustion gases toward one of said intake and exhaust valve means and said opening means disposed on the opposite side of said cross-over means position direct combustion gases from said combustion chamber toward the other one of said intake and exhaust valve means during operation of the engine.

8. In an internal combustion engine as set forth in claim 6, wherein the total cross sectional area of said opening means disposed on one side of said cross-over means portion is relatively larger than the total cross sectional area of the opening means disposed on the opposite side of said cross-over means portion.

9. In an internal combustion engine as set forth in claim 8, wherein the opening means disposed on one side of said cross-over means portion direct combustion gases toward one of said intake and exhaust valve means and said opening means disposed on the opposite side of said cross-over means portion direct combustion gases from said combustion chamber toward the other one of said intake and exhaust valve means during operation of the engine.

10. In an internal combustion engine as set forth in claim 9, wherein said opening means having the relatively larger total cross sectional area and disposed on said one side of said cross-over means portion direct combustion gases from said combustion chamber toward said intake valve means, and said opening means disposed on said opposite side of said cross-over means portion direct combustion gases from said combustion chamber toward said exhaust valve means during operation of the engine.

References Cited

UNITED STATES PATENTS

| | | | |
|---|---|---|---|
| 2,893,371 | 7/1959 | Schafer | 123—32 X |
| 2,925,070 | 2/1960 | Meurer | 123—32 |
| 2,979,043 | 4/1961 | Meurer et al. | 123—30 X |
| 3,132,633 | 5/1964 | Zimmermann | 123—32 |

WILLIAM L. FREEH, *Primary Examiner.*